(12) United States Patent
Lee

(10) Patent No.: US 7,172,282 B1
(45) Date of Patent: Feb. 6, 2007

(54) DETACHABLE EYEGLASSES

(76) Inventor: Jerry Wang Lee, No. 473, Chung-Shan S. Rd., Yung-Kang City, Tainan Hsien (TW)

( * ) Notice: Subject to any disclaimer, the term of this patent is extended or adjusted under 35 U.S.C. 154(b) by 0 days.

(21) Appl. No.: 11/234,170

(22) Filed: Sep. 26, 2005

(51) Int. Cl.
*G02C 1/04* (2006.01)

(52) U.S. Cl. .................. 351/103; 351/105; 351/106

(58) Field of Classification Search .......... 351/41, 351/44, 103–109, 124
See application file for complete search history.

(56) References Cited

U.S. PATENT DOCUMENTS 6,908,193 B2 * 6/2005 Cyr ........................ 351/103

* cited by examiner

*Primary Examiner*—Huy Mai

(74) *Attorney, Agent, or Firm*—Hershkovitz & Associates; Abe Hershkovitz

(57) ABSTRACT

A pair of detachable eyeglasses has a frame, a bridge and two integral lenses. The frame has a skeleton and two side bars formed at two ends of the skeleton. A lug is formed in a middle portion of the frame and multiple joint members are symmetrically provided in rear sides of the side bars. The bridge has two nose pads and a fastener mounted between the nose pads. A channel is defined in the fastener and a block is received into the channel. A groove is defined in a middle portion of the lenses and mated with the block so that a lower end of the middle portion is received into the channel thereby fastening the lenses to the bridge. Multiple slots are defined in two edges of the lenses and mated with the joint members.

5 Claims, 4 Drawing Sheets

DETACHABLE EYEGLASSES

BACKGROUND OF THE INVENTION

1. Field of the Invention

The present invention relates to a pair of eyeglasses, and more particularly to a pair of detachable eyeglasses.

2. Description of Related Art

Nowadays, a pair of conventional eyeglasses is composed of a frame, two lenses mounted on the frame, and two nose pads. The two nose pads are respectively mounted on a middle portion of the frame or integrally formed on the lenses, and therefore the pair of eyeglasses can be placed on a user's nose. However, the frame is simply mounted with the lenses such that the lenses are easily separated from the frame. Furthermore, the conventional eyeglasses can not be separated into the frame and lenses. Therefore, the invention provides a pair of detachable eyeglasses to mitigate or obviate the aforementioned problems.

SUMMARY OF THE INVENTION

The main objective of the present invention is to provide a pair of detachable eyeglasses that are easy to separate and securely be mounted on a user's nose.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
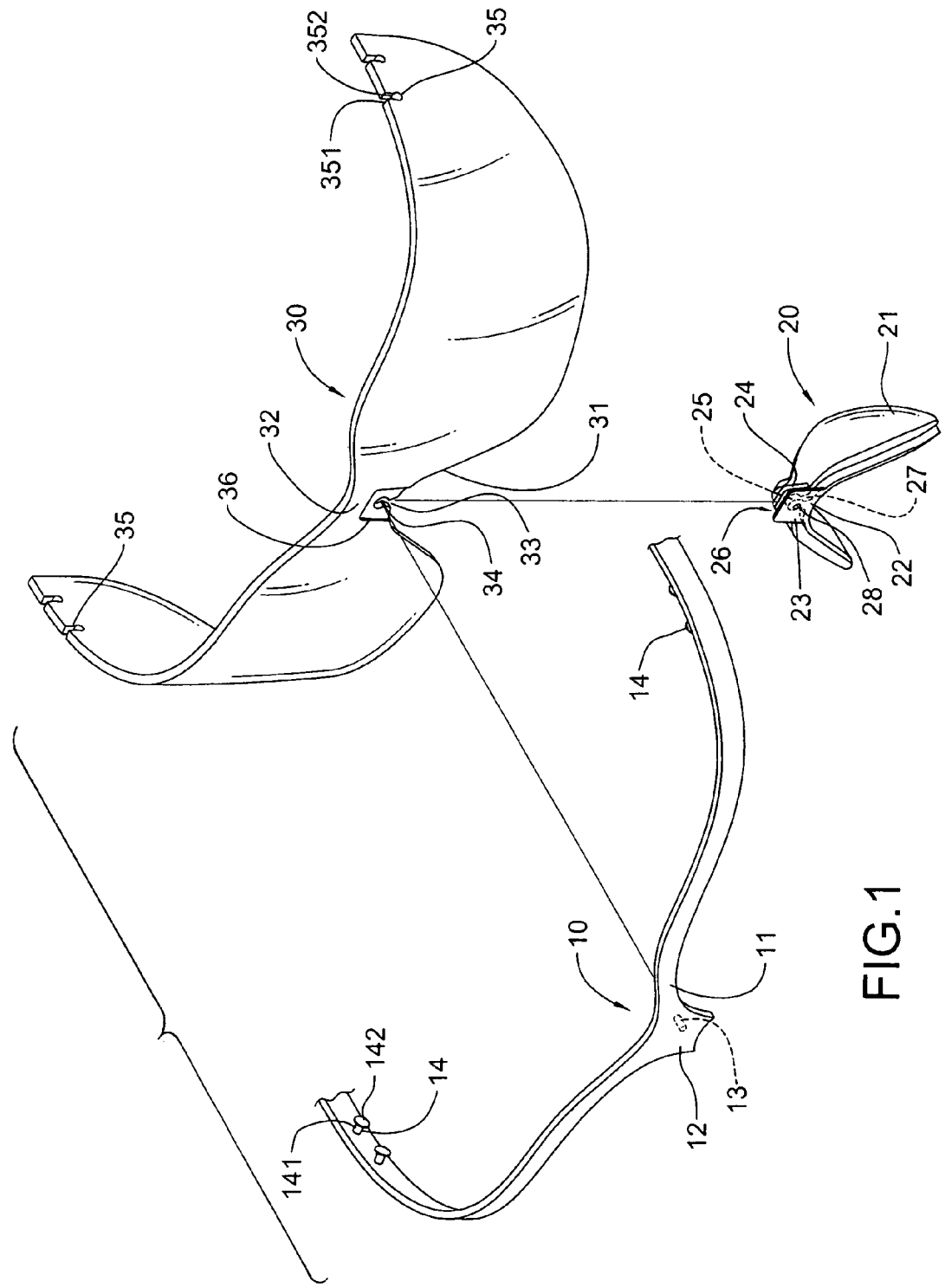
FIG. 1 is an exploded perspective view of a pair of detachable eyeglasses in accordance with the present invention.
Figure 2:
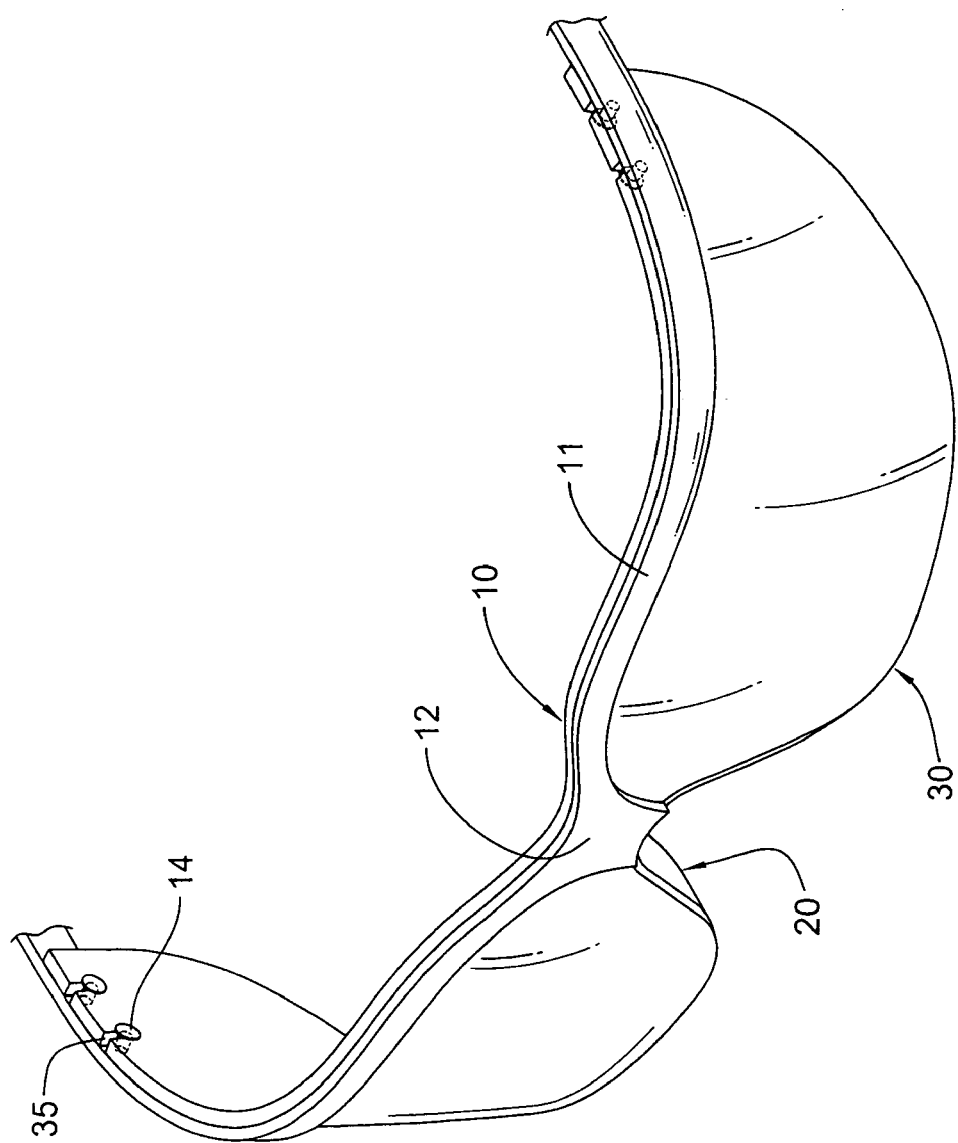
FIG. 2 is a perspective view of the pair of detachable eyeglasses in accordance with the present invention.
Figure 3:
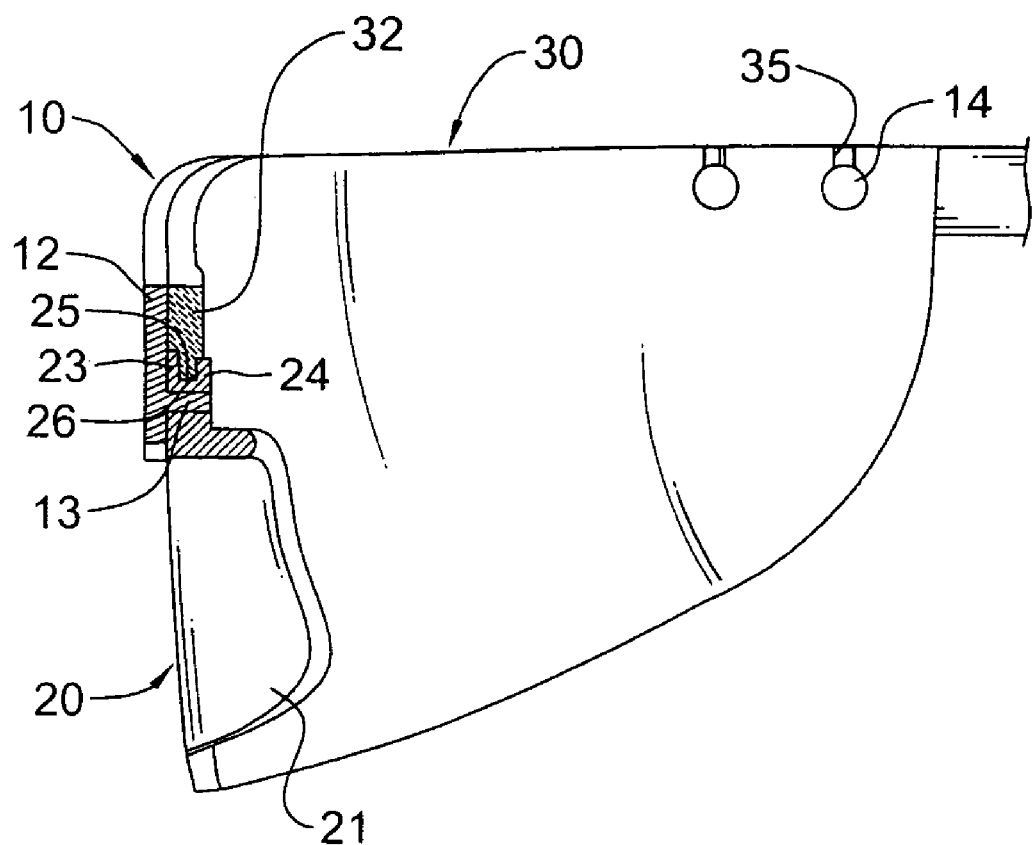
FIG. 3 is a side sectional view of the pair of detachable eyeglasses in accordance with the present invention.
Figure 4:
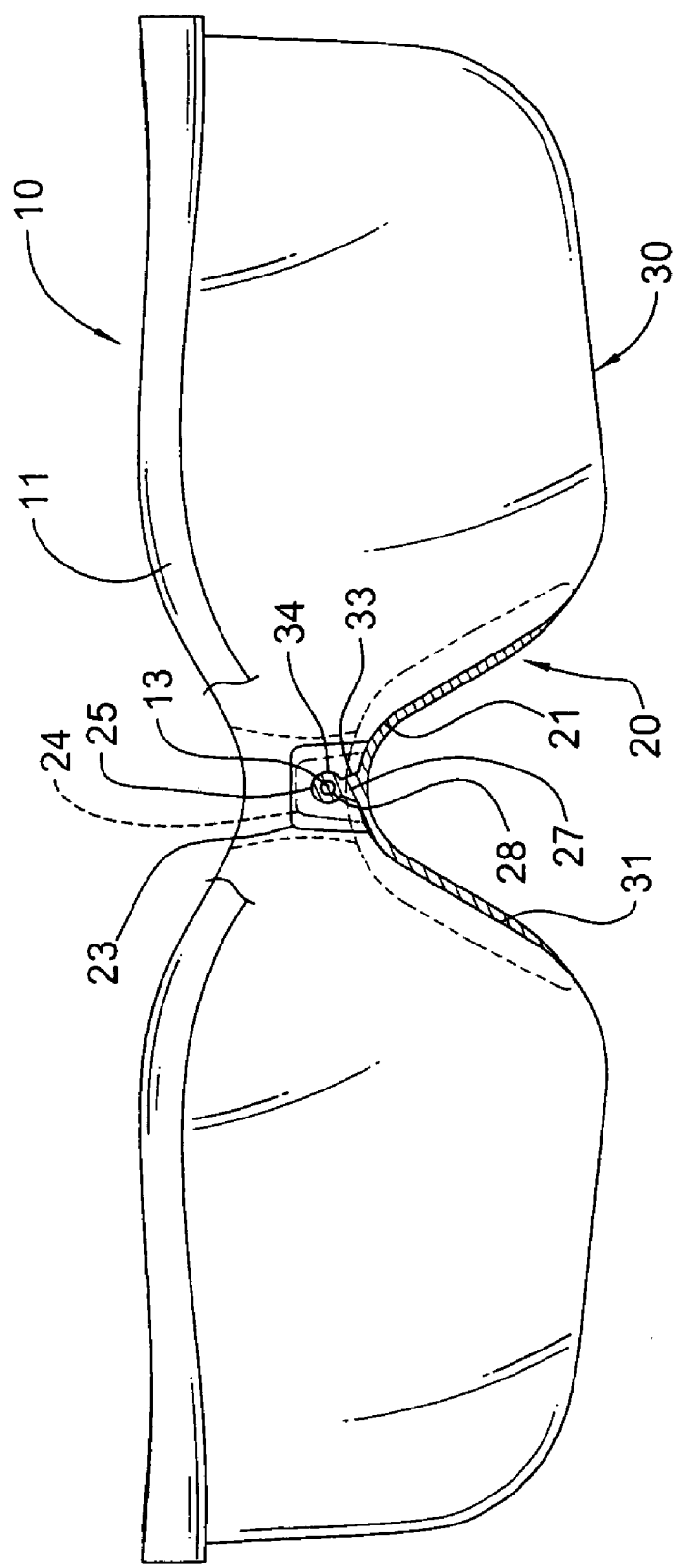
FIG. 4 is a back view of the pair of detachable eyeglasses in accordance with the present invention.

With reference to FIGS. 1–4 and in a first preferred embodiment of the present invention, a pair of detachable eyeglasses comprises a frame (10), a bridge (20), and two lenses (30) formed integrally.

The framework (10) is made of metallic material and is composed of a skeleton (11) and two side bars integrally formed at two opposed ends of the skeleton (11). The skeleton (11) is a V-like strip and configured to mate with the human forehead. A lug (12) is downwardly formed in a middle portion of the skeleton (11) and a rod (13) is integrally formed on a back side of the lug (12). Multiple joint members (14) are symmetrically provided on inner faces of the side bars and face each other. Two resilient ear pieces are respectively and pivotally mounted on distal ends of the side bars so that the ear pieces can be bent to abut the side bars and reduce the storage space. In the preferred embodiment of the pair of the detachable eyeglasses, the joint member (14) comprises a peg (141) and a resilient head (142) formed at a distal end of the peg (141). The outer diameter of the head (142) is slightly larger than that of the peg (141).

The bridge (20) is composed of a central fastener (22) with two symmetrical nose pads (21) respectively formed at two sides thereof. The fastener (22) comprises a front membrane (23), a back membrane (24) which is parallel to the front membrane (23) thereby defining a channel (26) between the front and the back membrane (23, 24), and a block (25) securely provided in the channel (26). In the preferred embodiment of the pair of detachable eyeglasses, the block (25) has an arcuate upper portion, and two gaps (27) defined in and extended towards two sides thereof. A hole (28) is defined in a center of the block (25) so that the rod (13) can be inserted into the hole (28).

The wing-like lenses (30) have a cutout (31). which is downwardly defined in a middle portion (32) thereof. A groove (33) is defined in a lower end of the middle portion (32) and has an arcuate upper groove wall to mate with the upper portion of the block (25). Two flanges (34) are respectively formed at two opposed ends of the groove (33) and extend towards the interior of the groove (33) to thereby engage with the gaps (27). Multiple slots (35) are respectively defined in two distal upper edges of the lenses (30) thereby being engageable with the joint members (14).

In the first preferred embodiment of the present invention, the width of the middle portion (32) is thicker than that of the channel (26), the lenses (30) further have a recess (36) defined in a front end of the lower portion (32) thereof to correspond to the front membrane (23) so that the middle portion (32) can be substantially inserted into the channel (26). In a second preferred embodiment of the detachable eyeglasses, the recess (36) is defined in a back end of the lower end of the middle portion (32) to mate with the back membrane (24). In a third preferred embodiment of the detachable eyeglasses, two recesses (36) are respectively defined in the front and the back membrane (23, 24).

With reference to FIG. 1, a lower end of each slot (35) is an arcuate portion to mate with the peg (141) and an opening (351) is defined in an upper end of each slot (35). A neck (352), the width of which is narrower than that of the peg (141), is defined in a middle portion of each slot (35).

In assembly, the bridge (20) is mounted under the cutout (31) and the fastener (22) corresponds to the middle portion (32), wherein the lower end of the middle portion (32) is received into the channel (26) thereby being securely grasped by the front and the back membrane (23, 24). The block (25) is inserted into the groove (33) so that the bridge (20) is securely mounted under the cutout (31). Furthermore, the rod (13) is inserted into the hole (28) and the joint members (14) are respectively inserted into the slots (35) downwardly so that the frame (10) is fastened to the lenses (30). Hence, the frame (10) is detachably and securely mounted with the bridge (20) and the lenses (30).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pair of detachable eyeglasses comprising:
   a frame (10) having an arcuate skeleton (11) and two side bars integrally formed at two distal ends of the skeleton (11), a lug (12) integrally and downwardly formed in a middle portion of the skeleton (11), a rod (13) provided on a rear side of the lug (12), multiple joint members

(14) symmetrically provided on inner faces of the two side bars and facing each other, and two ear pieces respectively and pivotally connected to the side bars;

a bridge (20) having a fastener (22) and two nose pads (21) respectively and symmetrically formed on two sides of the fastener (22), the fastener (22) having a front membrane (13) and a back membrane (24) parallel to the front membrane (13), a channel (26) defined between the front membrane (23) and the back membrane (24), and a block (25) securely provided in the channel (26); and two wing-like lenses (30) formed integrally and having a cutout (31) defined in a middle portion (32) thereof, a groove (33) defined in a lower end of the middle portion (32), and multiple slots (35) symmetrically defined in two distal ends of the lenses (30), whereby the groove (33) is engaged with the block (25) and the joint members (14) are respectively received into the slots (35).

2. The detachable eyeglasses as claimed in claim 1, wherein a rod (13) is transversely provided in a rear side of the lug (12) and a hole (28) is defined in a center of the fastener (22) to receive the rod (13).

3. The detachable eyeglasses as claimed in claim 1, wherein each joint member (14) comprises a peg (141) and a head (142) formed in a distal end of the peg (141), a lower end of each slot (35) is an arcuate portion to mate with a corresponding peg (141) and an opening (351) is defined in an upper end of each slot (35), and a neck (352), the width of which is narrower than that of a corresponding peg (141), is defined in a middle portion of each slot (35).

4. The detachable eyeglasses as claimed in claim 1, wherein the block (25) has an arcuate upper portion, two gaps (27) are respectively defined in two opposed sides of the block (25) and extended towards the block (25), the groove (33) has an arcuate upper wall and mated with the arcuate upper portion of the block (25), and two flanges (34) are respectively formed in two opposed sides of the groove (33) and extending to an interior of the groove (33), whereby the flanges (34) are respectively engaged with the gaps (27).

5. The detachable eyeglasses as claimed in claim 1, wherein the width of the middle portion (32) is thicker than that of the channel (26), a recess (36) is defined in a front end of the middle portion (32), whereby the front membrane (23) is mated with the recess (36) so that the lower end of the middle portion (32) can be inserted into the channel (26).

* * * * *